United States Patent [19]

Young et al.

[11] 4,135,101

[45] Jan. 16, 1979

[54] METHOD AND APPARATUS FOR CONTROLLING LOADS IN ELECTRIC POWER SYSTEMS BY REDUCTION OF PEAK LOADS

[75] Inventors: Glenn S. Young, Lee's Summit, Mo.; Arthur Laudel, Jr., Leawood, Kans.

[73] Assignee: Power Monitors, Inc., Kansas City, Mo.

[21] Appl. No.: 813,816

[22] Filed: Jul. 8, 1977

[51] Int. Cl.² .............................................. H02J 1/00
[52] U.S. Cl. .......................................... 307/39; 307/3; 307/40; 340/310 A
[58] Field of Search ...................... 307/117, 30, 34, 35, 307/38, 39, 62, 140, 3, 41, 40, 51; 324/103 R, 103 P, 113; 200/56 R, 56 A; 340/310 A

[56] References Cited

U.S. PATENT DOCUMENTS

| | | | |
|---|---|---|---|
| 2,081,044 | 5/1937 | Runaldue | 324/103 R |
| 2,874,310 | 2/1959 | Young | 307/34 |
| 3,133,202 | 5/1964 | Wildi | 307/38 |
| 3,755,686 | 8/1973 | Woods | 307/38 |
| 3,970,861 | 7/1976 | McCollum | 307/35 |
| 4,027,171 | 5/1977 | Browder et al. | 307/117 |

Primary Examiner—Robert K. Schaefer
Assistant Examiner—Morris Ginsburg
Attorney, Agent, or Firm—Lowe, Kokjer, Kircher, Wharton & Bowman

[57] ABSTRACT

This invention discloses a load management system for reducing the peak load in an electrical power distribution network. This invention monitors, records and reduces the peak load present in an electrical distribution network by deferring power service from and cycling power service to preselected transformer loads during periods of peak power demand. The peak load control function of the present invention is controlled by a power monitor which is located at the distribution transformer. The power monitor measures the ambient temperature and the power load on an associated distribution transformer and initiates the peak load control function whenever the product of the temperature factor and the measured load rises above a preset control point. Initiation of the peak load control function completely defers power service from a first group of low priority loads and activates a timing and switching mechanism which cycles power service among selected groups of controlled loads in a preselected order. As the peak load decreases, the peak load control function is terminated and full service is returned to all of the transformer loads. The point at which the control operation is initiated is a function of the maximum magnitude of the uncontrolled load and is automatically set and retained to provide a control point at which the peak load control function will be initiated in the future.

45 Claims, 14 Drawing Figures

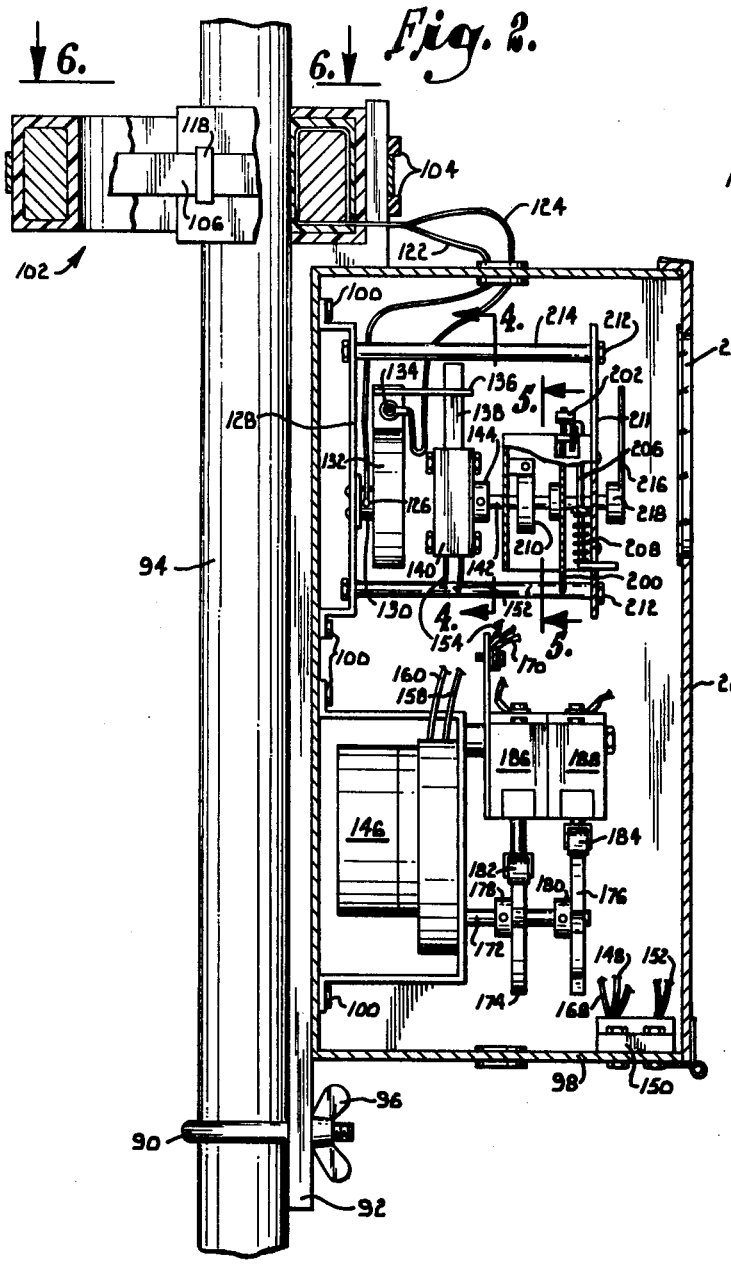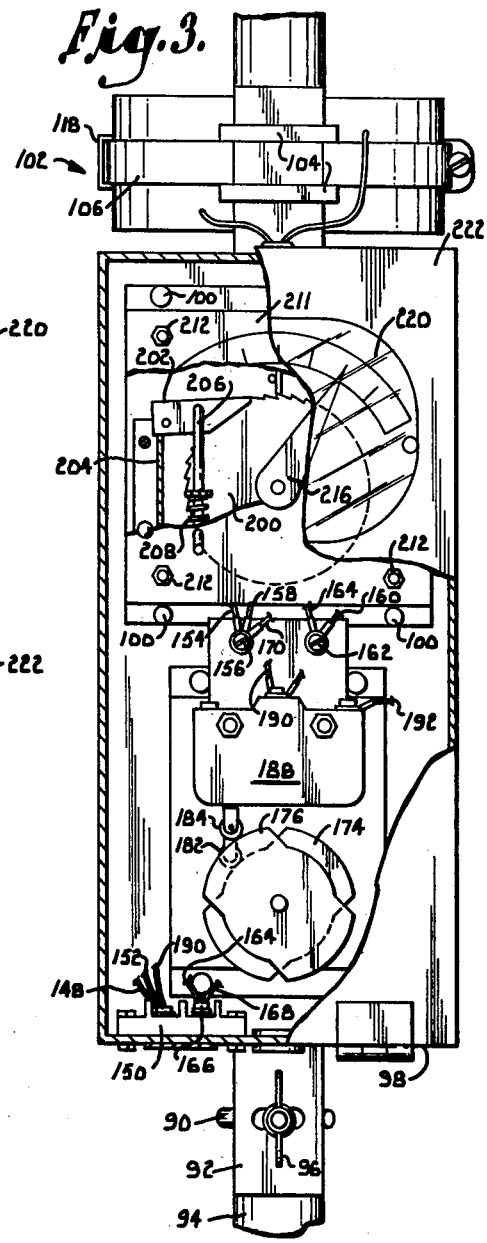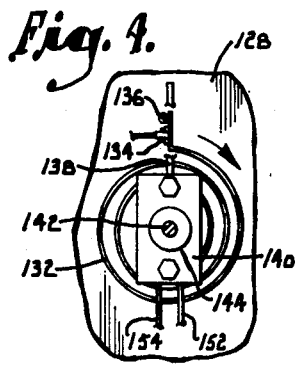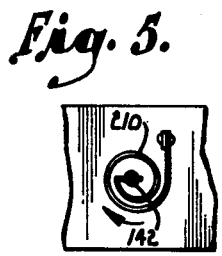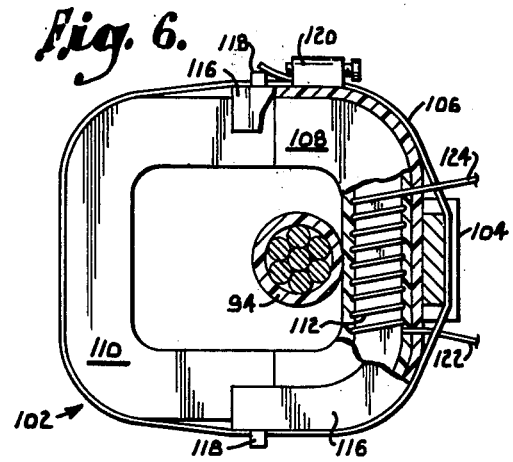

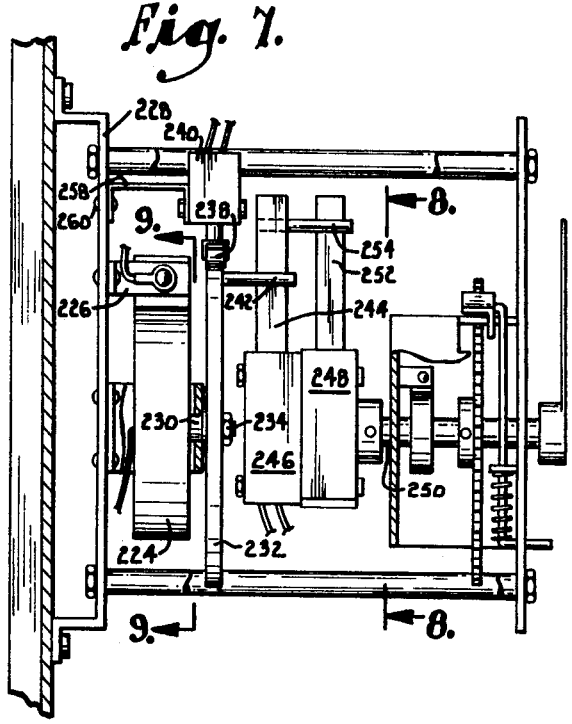
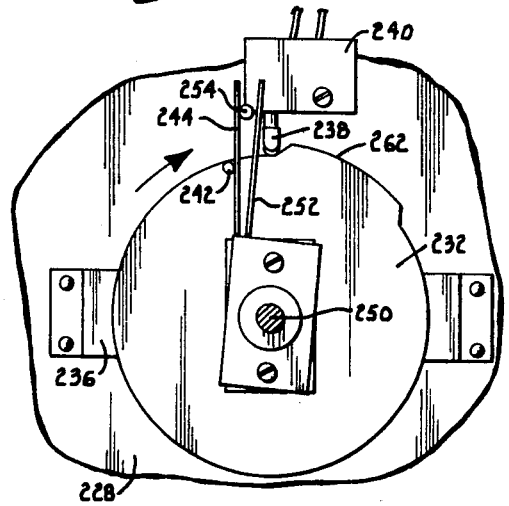
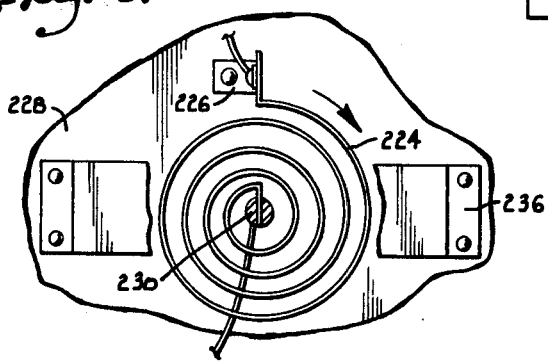
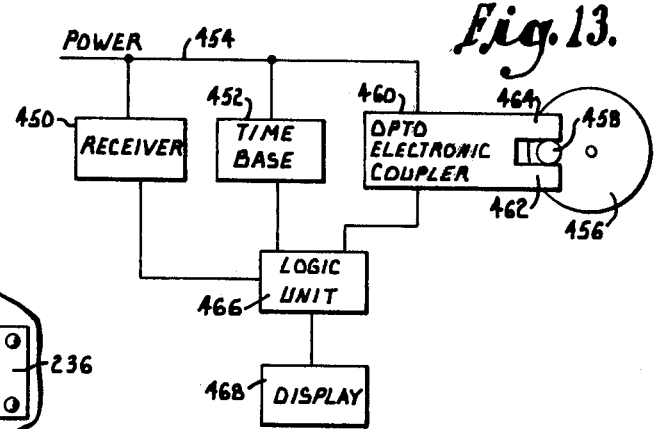
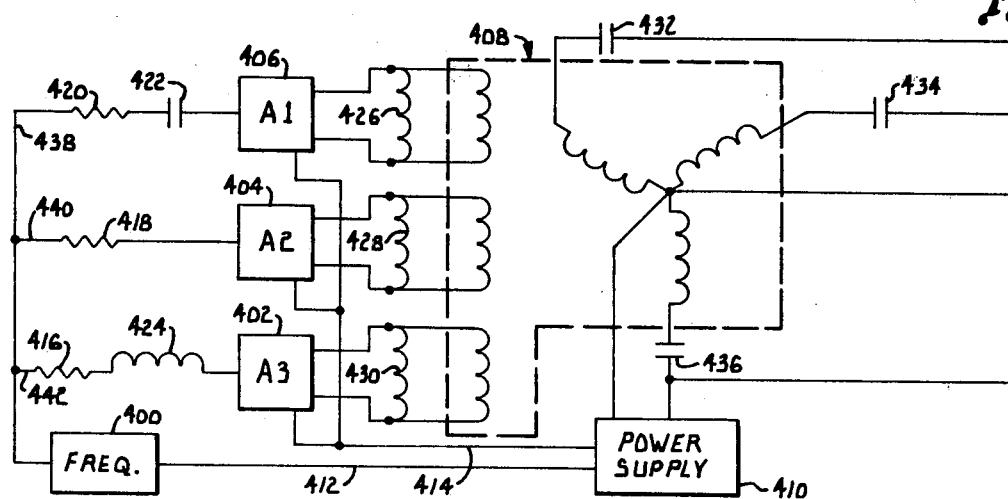

METHOD AND APPARATUS FOR CONTROLLING LOADS IN ELECTRIC POWER SYSTEMS BY REDUCTION OF PEAK LOADS

BACKGROUND AND BRIEF DESCRIPTION OF THE INVENTION

The subject invention relates in general to a load management system for use in commercial electrical power distributor systems. In particular, it deals with the art of controlling the distribution of power service to the constituent loads of an electrical distribution transformer to thereby reduce the transformer load during periods of peak electrical demand. This control function is achieved in part by a unique application of our prior invention ("Meter Apparatus Having Logarithmic Response to Current and a Linear Response to Temperature") as described in U.S. Pat. No. 3,398,368, and serves to reduce power demand during peak periods by deferring a portion of the power service supplied to lesser priority customer loads until such time as the peak demand subsides.

The high quality and plentiful supply of electrical power service became commonplace several years ago. Its low cost was largely due to the availability of an ample supply of low cost fuel and load building programs which resulted in high load factors. Historically, the power service industry has been able to forecast its potential load growth five to ten years in advance thereby allowing adequate lead time to increase production capacity to meet expected demands.

Within the last few years, however, the electric power service industries have been presented with a number of problems which threaten the established pattern of plentiful supply at relatively low cost. For example, the widespread and rapidly growing use on the part of residential customers of higher wattage appliances and intermittently operated convenience equipment is creating an acute shortage of system capacity for many electric utilities. The increasing use of air conditioning equipment is a prime example. In the past, peak demand periods were created principally by customers' use of electric lights. Therefore, the peaks ordinarily occurred between nightfall and midnight, and were most pronounced in the winter evenings. In many areas this situation has undergone an almost complete reversal, and the cooling load has now become by far the largest contributing factor. Major peaks now tend to occur in the hottest days of summer rather than in winter, and usually in the late afternoon rather than after the cool of nightfall. Moreover, the cooling demand normally occurs at times when the higher summer temperatures decrease the output potential of power generation equipment.

The cooling load demands large blocks of kilowatt generating capacity but consumes few kilowatt-hours in proportion to its high (almost 100%) contribution to peak system loading. Electric utilities must therefore commit unusually large capital investments for power generation in support of seasonal demand peaks. Unfortunately, electrical energy generally cannot be stored but must be manufactured, delivered and used instantly; consequently, billions of dollars worth of electric utility system capacity is idle (during off-peak periods) more than fifty percent of the time. Nevertheless, in many areas where system capacity goes unused a portion of the time during off-peak periods, utility networks are forced to increase generation capacity to meet peak demands. This additional capacity must be provided by new generating plants whose construction typically requires five to ten years or by gas turbine installations which can be made operational in twenty-four months. Although large capital investments are needed to construct traditional generation plants, this method of power generation utilizes relatively abundant fuels and operates fairly efficiently. In contrast, gas turbine generation requires a smaller capital outlay but requires the use of scarce fuel and is relatively inefficient.

Electric energy conservation programs now in practice reduce kilowatt-hours but do not reduce kilowatts of "demand" in the same proportion. This tends to lower the annual load factor which in turn increases kilowatt-hour costs. In fact, the conservation of kilowatt-hours of energy may be secondary to the conservation of kilowatts of "demand." However, by reducing peak loads and shifting energy demands to the valleys of the load curve, system capacity could be released and generation costs lowered.

Our invention provides a unique means for overcoming the aforementioned problems. In particular, our invention interrupts the distribution of power to a portion of the peak load in order to decrease the overall peak demand. The load deferral function is controlled by a power monitor which is located at the distribution transformer. Placement of the power monitor at the distribution transformer is advantageous because it is here that the individual customers' peaks merge into coincident peaks which normally correspond with the peak of the overall network. In any event, control at the distribution level using our invention releases capacity throughout the entire system. To our knowledge, the prior art does not teach load control at the distribution transformer to effect such a load management function.

The subject invention provides a load management system reducing peak loads in electrical power supply networks. The disclosed power monitor senses transformer current flow and produces a logarithmic current flow in an associated resistive electrical circuit comprised of a bimetal spiral coil. The heating effect caused by the induced current flow combined with the ambient temperature of the system produces a rotational response in the bimetal spiral coil related to the effective load on the transformer. Rotation of the bimetal spiral coil in response to an increasing transformer load closes the contacts of a control switch which activates the load deferral function of the present invention. Rotation of the bimetal spiral coil also causes the control switch to rotate to a point representative of the peak load on the transformer.

The maximum control switch setting is mechanically preserved by a rachet device and is thereafter used as an upper system control point. Once the upper system control point has been set, subsequent transformer loading drives the bimetal spiral toward the upper control point and closes the control switch when the control point is reached. If the transformer uncontrolled load increases above the previous peak, the control switch is rotated to a new point corresponding to the increased peak load thereby establishing a new upper level control point. In this way the power motor device of our invention is self setting and switching of the controlled load always occurs at a peak that has been established by the uncontrolled load.

Closure of the control switch causes complete interruption of electrical service to a number of the controlled loads served by the transformer called the deferrable loads and activates a motorized cam driven timing device. The motorized cams operate on switching means to selectively interrupt electrical service for preselected time intervals to a second group of loads called the cyclical loads, thereby cycling the service supplied to these loads. The contractive rotation of the bimetal spiral in response to a decreasing transformer load opens the contacts of the control switch restoring uninterrupted service to all of the cyclical and deferrable loads. A variation of the invention provides a lower system control point to control a third plurality of controlled loads. When transformer loading decreases sufficiently to activate the lower level control switch, electrical service from the transformer is provided to a third group of loads which comprises low priority loads not demanding at least partial service during periods of relatively high transformer loading.

An alternate embodiment of the present invention includes a signal generator and receiver for sending and receiving high frequency control signals over ordinary power distribution lines to activate the above described load deferral function. The use of high frequency control signals to cycle, defer and record the peak load provides two additional control options. First, a signal generator capable of sending a universal control signal can be used by the dispatcher of a power company to remotely initiate the load deferral function of each power monitor in the system. Second, the control signal can be provided by the dispatcher to sensors at each distribution transformer which in turn sends a repeat signal to remove preselected loads from the system during periods of peak demand.

It is therefore an object of the present invention to provide a unique method and apparatus for controlling peak loads in electrical power supply networks.

A further object of the present invention is to provide a unique method and apparatus for reducing the peak load in a power supply network by completely interrupting electrical service to a first group of controlled loads and by cycling electrical service to a second group of controlled loads. Reduction of the network peak load effectively increases the capacity of the network thereby increasing the efficiency of the network's supply equipment.

A further object of the present invention is to provide a unique method and apparatus that can control certain constituent loads served by an electrical distribution transformer to thereby reduce a portion of the peak demand placed on said transformer. It is a feature of this invention that the power monitor device can be easily and rapidly mounted in proximity to the distribution transformer without interrupting power service to the customer.

Another object of the present invention is to provide a unique method and apparatus for automatically controlling the peak load in a power supply network by means of a self-setting control mechanism that does not require continuous monitoring.

Another object of the present invention is to provide a unique method and apparatus that is operable to provide a load management function at the individual transformer level in order to increase the annual load factor on the associated power supply network.

A further object of the present invention is to provide a unique method and apparatus that is operable to identify and record the magnitude of an electric utility customer's contribution to the peak load. By assessing each customer's responsibility for the peak load, a cost base pricing system may be established wherein each customer will be charged in relation to their contribution to the peak load.

Another object of the present invention is to provide a unique method and apparatus that is operable to inhibit electrical power service to selected loads served by a particular distribution transformer to periods when the transformer load is relatively low.

Another object of the present invention is to provide a unique method and apparatus that can control the peak load in a power network by means of incremental load deferral so that a smoother control of these loads can be obtained.

Other and further objects of the invention, together with the features of novelty appurtenant thereto, will appear in the course of the following description of the drawings.

DETAILED DESCRIPTION OF THE INVENTION

In the accompanying drawings, which form a part of the specification and are to be read in conjunction therewith and in which like reference numerals are employed to indicate like parts in the various views:

FIG. 2 is a side elevational view of our device for controlling peak loads in power supply networks shown in operative relationship to an electrical power line, parts being broken away for purposes of illustration;

FIG. 3 is a front elevational view of said device, parts being broken away for purposes of illustration;

FIG. 4 is a cross-sectional view taken along the lines 4—4 of FIG. 2 in the direction of the arrows showing the bimetal spiral and control switch in greater detail;

FIG. 5 is a cross-section taken along the line 5—5 of FIG. 2 in the direction of the arrows;

FIG. 6 is a plan view taken along line 6—6 of FIG. 2 showing the split core current transformer of the power monitor device;

FIG. 7 is a side elevational view of a modified embodiment of our load control device, parts being broken away for purposes of illustration;

FIG. 8 is a cross-sectional view taken along the lines 8—8 in FIG. 7 in the direction of the arrows;

FIG. 9 is a cross-section view taken along the lines 9—9 of FIG. 7 in the direction of the arrows;

FIG. 12 is a schematic diagram of a signal generator for generating electronic control signals for load control in electrical power systems;

FIG. 13 is a block diagram of a demand attachment to a watthour meter to be used in our invention.

Figure 1:
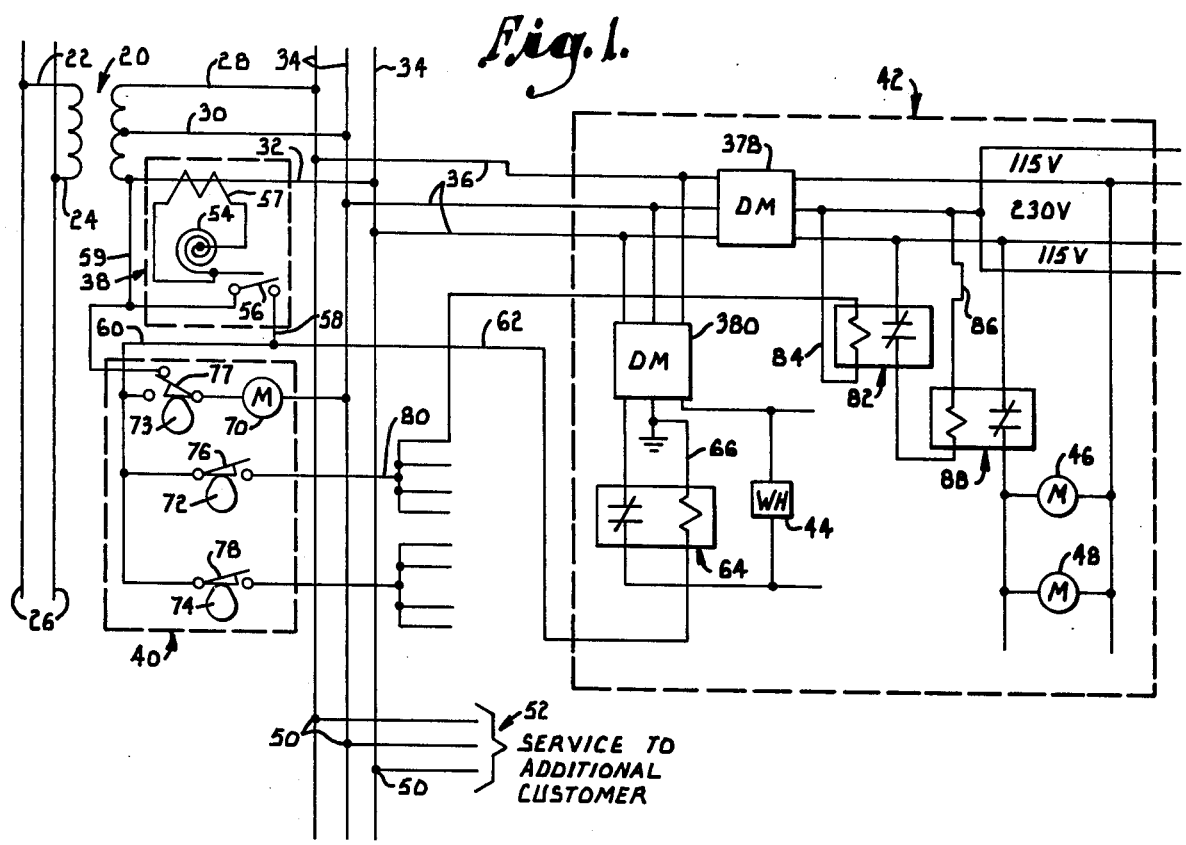
FIG. 1 is a schematic diagram of an elementary form of our invention for reducing the peak load in power supply networks.

It will be helpful in understanding the general nature of this invention to refer first to FIG. 1 wherein the rudiments of the invention are schematically shown in a typical load management application. The subject invention comprehends a commercial electrical power distribution network wherein an ordinary pole mounted distribution transformer 20 has its primary windings connected by means of leads 22 and 24 to a high voltage alternating current supply line 26. The center tapped secondary winding of the transformer is connected by leads 28, 30 and 32 to the three wire low voltage feeder 34 which supplies power via various branch lines such as lines 36 to individual consumer's premises. Typically, a group of six to ten residential customers receive power in this fashion from a single transformer. Between the center lead 30 and each of the outer leads (either 28 or 32), it may be assumed for convenience that the voltage is a standard 115 volts and that the voltage between the two outer leads 28 and 32 is double this value, i.e., 230V.

A portion of our load cycling invention comprises a device which is mounted in close proximity to the distribution transformer and includes a power monitor (generally indicated within broken lines 38), and timing and switching means (generally indicated within broken lines 40). Our device functions to control the distribution of electrical power to two groups of transformer loads designated deferrable loads and cyclical loads. During periods of peak demand, our invention completely interrupts power service to the deferrable loads and cycles (switches power off and on) service to the cyclical loads at timed intervals determined in part by the magnitude of the load on the transformer 20. In this way, the net transformer load can be reduced and the ability of the transformer to service higher priority loads correspondingly increases.

It must be pointed out that our invention does not necessarily eliminate the total demand created by the controlled loads although elimination of a portion of the demand is a result. Our invention partially removes various loads from service until the peak load subsides to a lower prescribed demand level. In this manner, the "peaks and valleys" of load demand commonly experienced in power supply networks are smoothed or leveled somewhat. The transformer loads typically controlled by our invention include power consuming appliances which are low priority users of electrical power in the sense that electrical power service may be interrupted for brief time intervals without adverse consequences.

For purposes of discussion, the cyclical and deferrable loads typically found on the customer's premises are depicted within the broken line 42, and are represented as a water heater 44, an air conditioner compressor motor 46 and condenser cooling fan motor 48. Similar loads may be present at each of a plurality of other customers' premises served by transformer 20, each said customer being served by parallel branch connections to feeder lines 34, such as connections 50 which are shown to serve a second customer's premises 52.

The power monitor 38 is basically comprised of a bimetal spiral strip 54, a switch 56, and a power monitor transformer 57 that inductively couples the bimetal spiral coil and the secondary distribution line. Only one distribution line 32 is monitored since loads are typically balanced and, even if there is a substantial unbalance, the peak on distribution line 32 is very close to the peak load on transformer 20. In operation, the power monitor transformer 57 senses current flow in distribution transformer 20 and produces a corresponding current flow in the bimetal spiral coil. The heating effect caused by this induced current combined with the ambient temperature causes the bimetal spiral coil to expand and rotate. This rotation of the coil forces the normally open contacts of rotably mounted switch 56 to close and the continued rotation of the spiral coil causes switch 56 to rotate to a point representative of the magnitude of the peak load on transformer 20 as reduced by our invention. Upon closure of switch 56, an energizing signal is sent from one line 32 of the secondary winding of transformer 20 through switch 56 and wire 59 to both the timer 40 and the customer's premises. The energizing signal is sent through line 56 to the timer 40 via line 60 and normally closed contact 77 and to the customer's premises on pilot wire 62. Pilot wire 62 is connected to one side of switching relay 64, while the other side of this relay is connected to ground via line 66. This relay is series connected in a trip circuit to water heater 44 which receives power from branch lines 36. A control signal on pilot wire 62 energizes relay 64 thereby interrupting electrical power service to water heater 44 and deferring this power to provide capacity for additional loads. Control of power service to the water heater is therefore directly dependent on the opening and closing of power monitor switch 56.

As mentioned above, the control signal from power monitor 38 is also delivered to timer 40. Timer 40 comprises a timing motor 70 having an output shaft with a plurality of cams attached thereto, indicated by the numerals 72 and 74. Each cam operates on an associated switching means shown by numerals 76 and 78 and each cam/switching means combination is associated with the control of power service to one or more of the customers served by transformer 20. For purposes of description, it will be assumed that each cam/switching means combination provides load cycling control to one-half of the customers served by the associated transformer. The cams and their respective lobes are alternately positioned on the driving shaft so that rotation of the shaft causes the cams to operate on the associated switching means in a sequential manner. In this way, a first group of cyclical loads is removed from power as one of the cams times in while power is restored to a second group of cyclical loads as the second cam times out. Cam 72 and associated switching means 76 are shown to be electrically connected to the first customers premises 42 via pilot wire 80.

After the contacts of switch 56 have been closed as described above, a control signal is sent from the secondary winding of transformer 20 to timer 40 and timing motor 70 via lines 58 and 60 and normally closed contact 77. This control signal activates timing motor 70 causing the fixed speed rotation of a plurality of cams attached to the output shaft of the motor. In other words, timing motor 70 rotates cam 72 causing the lobe of the cam to contact and close the normally open switch means 76. Closure of this switch completes a circuit through which an energizing control signal is delivered through switch 76 to one side of circuit opening relay 82 via pilot wire 80. The other side of this relay is connected to a secondary branch lead by line 84. Energization of relay 82 opens the normally closed contacts of the relay, thereby opening an air-conditioner control circuit comprising thermostat 86 and circuit opening relay 88. Once the air-conditioning control circuit has been open-circuited, relay 88 is de-energized and the contacts of the relay are tripped open which in turn opens the 230 V. trip circuit comprising air-conditioner compressor motor 46 and condenser cooling fan motor 48. Thus, electrical service to the air conditioner is interrupted. The duration of this service interruption is determined by the rotational speed of the timer motor and the lobe profile of cam 72. When cam 72 times out, switch means 76 resumes its normally open state and power service is restored to the associated air-conditioning load. As the cycle continues, cam 74 closes switch means 78 thereby interrupting electrical service to the air-conditioning load at the second customer's premises 52. As the timing motor output shaft continues to rotate through a first revolution the plurality of cams attached thereto sequentially operate on their respective switching means, temporarily interrupting power service to the air conditioning loads at each of the customer's premises served by transformer 20 for a prescribed time interval.

The above described deferral of power service to the hot water heaters and cycling of power service to the air conditioner loads is continued until the peak load on transformer 20 subsides to the control point setting at which time switch 56 is opened and full electrical service is immediately restored to all of the controlled loads. However, rather than immediately resuming uninterrupted service to the cyclical loads, a latching means is provided in timer 40 which latches the timer into the completion of a full revolution after switch 56 is opened. This latching feature is provided to avoid short term cycling which could otherwise occur when load deferral causes switch 56 to open prior to the completion of a full cycle thereby leaving cams in midcycle and resulting in potential long term service interruption. This latching means is comprised of a third cam 73 which allows the motor 70 to draw power independent of switch 56 through wire 59 and switch 77 so that timer 40 will complete a full cycle.

Having generally described the operating principle of the invention, attention is now directed to FIGS. 2 and 3 wherein one practical embodiment of our load cycling device is shown in more detail. The device displayed in FIGS. 2 and 3 represents that portion of our invention which is normally located in close proximity to the distribution transformer. As previously mentioned, this device functions to monitor the magnitude of loading on the associated transformer, set a control point corresponding to maximum transformer loading, and subsequently compare the sensed value with the control point value. This portion of the invention also provides a means for timing the duration of service interruption and further furnishes a means for sending control signals to receiving means associated with each of the controlled loads.

As shown in FIG. 2, a threaded hook bolt 90 passes through one end of aluminum (or other nonmagnetic) mounting bracket 92, partially encircling conductor 94 which is drawn into close proximity to bracket 92 by tightening wing nut 96. In the case of electric utility applications, conductor 94 may comprise one or more alternating current carrying leads from the secondary winding of the associated transformer (not shown) whose loading is being controlled. Housing 98 is secured to bracket 92 by means of screws 100. Power monitoring transformer 102 is attached to bracket 92 by means of mounting brackets 104 and metal band 106.

Turning briefly now to FIG. 6 which shows the power monitor transformer 102 in greater detail, the power monitor transformer is comprised of two laminated core sections 108 and 110. Secondary distribution conductor 94 serves as the primary winding of the transformer and the secondary winding 112 is wound around core section 108 as shown in FIG. 6. Both sections of the core are separately encapsulated in a suitable plastic medium to prevent rusting of the core. Sectioning of the core in this manner facilitates field installation of the device by obviating the need to interrupt electrical service from the distribution transformer during installation. Plastic housing 116 conforms to and partially encloses three sides of core section 108. Its curved end sections extend beyond the ends of core section 108 and enclose a portion of the ends of core section 110. A ductile nonmagnetic metal band 106 (or any suitable clamping means) is positioned around the current transformer assembly, passing through guide brackets 118 and between mounting brackets 104, each of said brackets being embedded into housing 116. Worm gear mechanism 120 provides a means for tightening the metal band 106 to effectuate assembly of core sections 108 and 110 around conductor 94.

Returning now to FIGS. 2 and 3, the secondary winding of power monitor transformer 102 is terminated into secondary winding leads 122 and 124. Lead 122 is electrically connected to the hub 130 of bimetal spiral strip 132 at 126. The hub is fixedly attached to mounting base 128, which in turn, is secured to housing 98 by screws 100. Bimetal spiral coil 132 has its inner most end secured to hub 130 by soldering, brazing or the like causing the inner end to be held stationary, while the outer end of the bimetal coil remains free to rotate (due to expansion and contraction forces) about the axis of hub 130. Secondary lead 124 is electrically connected to the free outer end of the bimetal element by screw 134, said lead being sufficiently flexible so as not to impede the rotation of the bimetal strip.

At this point it should be noted that the foregoing description of the power monitoring current transformer and bimetal spiral coil substantially comprises the power monitoring control circuit disclosed in our previous U.S. Pat. No. 3,398,368, wherein appropriate details of construction and selection of suitable materials are more fully disclosed. It should be pointed out here, however, that there are a number of alternative approaches for conducting the above described transformer monitoring function. For example, transformer current flow can be measured by monitoring the forward drop through a semiconductor which is approximately a logarithmic function of the current passing through it, or the current flow can also be sensed through the associated magnetic field using Hall effect devices. The effects of ambient temperature on transformer loading can be sensed using temperature sensitive electronic devices such a thermistors and high TCR resistors. This temperature sensing feature can likewise be accomplished electronically using certain magnetic domain devices. In the present application, the unique ability of the power monitoring circuit to sense distribution transformer current flow and combine the heating effect of the current flow with ambient temperature, is employed to record peak loading on the distribution transformer, and also to activate various timing and switching devices (as will be discussed below) which function to control electrical service to selected loads served by the distribution transformer.

In response to an increasing load on distribution transformer 20, bimetal spiral coil 132 expands and rotates in a clockwise direction (as viewed in FIGS. 3 and 4), in turn rotating bimetal arm 136 which is suitably attached to the outer end of bimetal spiral 132 and perpendicularly extends from the plane of rotation of the spiral. The continued rotational response of bimetal spiral coil 132 causes bimetal arm 136 to come into contact with switch actuating arm 138. Actuating arm 138 is pivotally mounted to the normally open swith 140 which is fixedly secured via collar and set screw 144 to one end of shaft 142, such that rotation of switch 140 causes the shaft to likewise rotate. Switch 140 is connected in series with a 110 v. power source and timer motor 146. Input power is delivered to the device from the 110 v. power source on "power source" line 148 which is connected to terminal 150. Line 152, which is also connected to terminal 150, relays the input power to one terminal of switch 140. The other terminal of switch 140 is electrically connected to terminal 156 via line 154 and subsequently to the synchronous timer motor 146 by line 158. A second line 160 from timer motor 146 is indirectly connected to neutral line 168 at terminal 166 via terminal 162 and line 164.

In system operation, the continued expansion and clockwise rotation of the bimetal spiral coil in response to an increase of the load on the distribution transformer forces bimetal arm 136 against actuating arm 138 closing the normally open contacts of switch 140. In the present embodiment closure of switch 140 initiates two key functions: (1) the transmission of a control signal by a pilot wire (or alternatively, a high frequency signal sent by means of ordinary electrical power lines) to disconnect certain deferrable loads from the system; and (2) the activation of timing motor 146 initiating the cycling of electric service to certain cyclical loads, as will be discussed below. In other words, switch 140 is at least partly responsible for controlling power service to two preselected load groups served by the associated distribution transformer. It should also be noted that the switching function provided by switch 140 can also be accomplished electronically by an opto-isolator. Remote actuation by a dispatcher can also be accomplished by a normally open relay contact connected in parallel with switch 140 which can be activated by a signal sent from the dispatcher.

Referring now to the first key function mentioned above, closure of switch 140 completes a circuit path which transmits a control signal from the hot lead 154 of switch 140 to line 170 at terminal 156. As previously described with respect to FIG. 1, line 170 sends this control signal directly to the customer's premises in order to cause normally closed relays at the premises to be tripped open, thereby completely interrupting and deferring power service from the deferrable loads which are connected to the tripped circuit. This signal can also be sent by a high frequency generator operating in combination with existing power distribution lines, as will be discussed later. It should be noted here that override switches could conceivably be installed in the above described deferring circuit at each customer's premises, in order to provide the customer with the option to avoid power service deferrals at his premises. However, possible individual overrides at some premises would not thwart the overall operation and benefits of the deferring circuit.

As mentioned above, the second function initiated by closure of switch 140 relates to load cycling rather than deferral of power service. Load cycling involves the delivery of intermittent power service to a selected group of loads during peak load periods, rather than the continuous suspension of power service during these periods. Upon closure of switch 140, energizing power is delivered to input leads 158 and 160 of sychronous timer motor 146 by means of previously discussed circuitry. Synchronous timer motor 146 yields a rotational speed of one revolution per hour on its output and includes a common latching feature that causes the first revolution to be completed once commenced even though the energizing power is removed from the motor during the course of the revolution. Timer motor 146 has an output shaft 172 with cam elements 174 and 176 attached thereto and held tightly in place thereon by retaining collars 178 and 180. The cam elements 174 and 176 contact and operate on rolling type cam tappets 182 and 184 respectively, which act as switch levers for normally open switches 186 and 188. These switches are series connected with a power source and respective relay energizing circuits and in the embodiment each switch comprises a portion of a relay energizing circuit to one-half of the customers served by the associated distribution transformer. As shown in FIG. 3, for example, switch 188 has one of its contacts connected via lead 190 and connection terminal 150, to the power source line 148, while the other contact of the switch is connected to the outgoing line 192. Recalling the previous description with respect to FIG. 1, the pilot wire indicated by the numeral 80 (shown in FIG. 1,) functionally corresponds to the above mentioned outgoing line 192 (shown in FIG. 3).

Once timer motor 146 has been energized, the output shaft 172 of the motor and attached cam elements rotate at a constant speed. The edges of the cams operate on the contact followers to close the normally open contacts of the respective switches 186 and 188, thereby energizing the aforementioned pilot wires. With the rotational speed of output shaft 172 constant, the closure sequence and closure time interval of switches 186 and 188 is controlled by the profile of the associated cam and the cams relative positioning on the output shaft. As seen in FIG. 3, cams 174 and 176 both possess two prominent opposing lobes, each lobe is designed to provide fifteen minutes of feed time to the associated tappet followed by fifteen minutes of dwell time (assuming the cams are driven at the rate of one revolution per hour). In other words, each cam is comprised of four-fifteen minute segments, two of the segments serve to open the associated switch and two act to close it. These fifteen minute time intervals correspond to the periods during which power service is interrupted or restored to the controlled loads. The positioning of cams 174 and 176 on the output shaft is staggered such that their phase timing is 90° apart.

Assuming that each cam is associated with the load control of one-half of the served customers, the phased cam scheme described above effects cycling of all the cyclical loads at fifteen minute intervals, such that a service interruption is imposed on one-half of the served customers' cyclical loads at nearly the same point in time that service is restored to the remaining one-half of served customers' cyclical loads. The net effect of this scheme is a fifty percent reduction of power service to the cyclical loads, or stated differently, that portion of the distribution transformer loading attributable to the cyclical loads is reduced by a factor of one-half during peak load periods. The above described fifty percent load cycling operation could also be performed by a single cam with a double throw switch.

Loading conditions in some geographic areas may dictate that cycling times be varied from that decribed above. This change in cycling time can be accomplished by either changing the rotational speed of timing motor 146 or selecting different cam elements. The timing and switching functions performed by timer motor 146, cams 174 and 176, and switches 186 and 188 can also be accomplished by electronic circuit means, though we have chosen to employ a single electromechanical approach.

Returning now to a further discussion of bimetal spiral coil 132 and its associated control switch 140 (ref. FIGS. 2, 3 and 4), a steadily increasing load on the distribution transformer causes the coil to expand and rotate. This increasing load is sensed by the power monitoring current transformer 102 and relayed to the coil via lines 122 and 124. The continued expansion of the spiral strip closes switch 140 by forcing bimetal arm 136 against switch actuating arm 138. Closure of switch 140 initiates the deferring and cycling function for load control as previously discussed.

A unique feature of this device is its ability to automatically retain a set point representation of the maximum magnitude of the uncontrolled load. As used herein, the term "uncontrolled load" refers to the portion of the load that is unaffected by the deferring and cycling operation. The recording function is accomplished in part by the rotatably mounted control switch 140. As the control switch is driven closed by the bimetal spiral coil, the deferrable loads and a portion of the cyclical loads are removed from the distribution transformer. A continued power increase in the uncontrolled loads during a period of peak demand causes the bimetal spiral coil to keep expanding thereby exerting a sufficient force against actuating arm 138 (via arm 136) to force the clockwise rotation (as viewed in FIGS. 3 and 4) of control switch 140 and its attached free turning shaft 142. The maximum degree of rotation of the control switch 140 is proportional to the maximum magnitude of the uncontrolled load on the distribution transformer, as sensed by the power monitoring portion of our control device. This maximum rotational point therefore becomes the "control point" at which our device initiates its load control functions (i.e. load deferral and cycling) in the future.

It must be noted, however, that the setting of the control point is at least partly affected by the timing scheme associated with the cyclical loads since the net duration of service interruption of the cyclical loads affects the magnitude of the uncontrolled load. For example, the use of the cam elements and timing scheme discussed with reference to FIG. 3 yields a control point setting determined by the uncontrolled load whose value is augmented by a factor of one-half of the cyclical load (the deferred load remains disconnected and does not contribute to the magnitude of the uncontrolled load or control point setting). The substitution of different cam elements and phase timing will change the control point setting which is a function of the uncontrolled load and the controlled loads.

The control point setting is recorded or preserved by means of a ratchet gear 200 and ratchet pawl latch 202 which is pivotally mounted on support 204. The ratchet gear is fixedly secured through its central aperture on shaft 142 such that the clockwise rotation (as viewed in FIG. 3) of control switch 140 is transmitted to the ratchet gear through the common shaft 142. As the uncontrolled load on the distribution transformer begins to subside from the peak magnitude, the bimetal spiral element cools and rotates counterclockwise. The control switch 140 however, is restrained from likewise following the bimetal spiral strip's motion (counterclockwise) as a result of the ratchet pawl latch 202 having engaged the saw-tooth periphery of ratchet gear 200, thereby preventing the associated shaft and control switch from counterclockwise rotation. Once the control point has been set in this manner, a subsiding peak load causes the cooling bimetal spiral to move bimetal arm 136 away from control switch arm 138 opening the contacts of the control switch 140. Opening the control switch results in the restoration of service to the deferred loads, and also conditions the timing motor latching means to de-energize the timing motor following the completion a full timing cycle. As previously mentioned timing motor 146 includes such a latching feature; however, it should be noted here that the necessary circuit latching means can be readily provided external to the timing motor using any one of several approaches. One such approach not shown in the drawings, for example would employ a third cam attached to shaft 172, said cam operating on a switch means which would close circuit the timer motor to a power supply circuit except on those occasions when a timing cycle is completed whereupon the power supply to the timer motor is removed. In any event, when the timing motor is de-energized at the end of a timing cycle, uninterrupted service is restored to all the cyclical loads.

A ratchet reset mechanism is also provided to allow the manual resetting of the control point. A rod 206, movable at one end and loaded by spring 208, is attached to ratchet pawl latch 202. Manual movement of the rod against the spring load raises and disengages the pawl from the ratchet gear which then rotates counterclockwise (as viewed in FIG. 3) in response to a resetting force appropriately supplied by loading spring 210 which is attached to shaft 142. Loading spring 210 is shown in greater detail in FIG. 5.

A face plate 211 is mounted to base 128 via stud bolts and screws 212 and spacing sleeves 214. Face plate 211 is externally viewable through the transparent window portion 220 of hinged front cover 222. The upper portion of the face plate possesses a circular "percent scale" scale logarithmically graduated from 25 to 300 percent in accordance with the unique load sensing features of our Power Monitor System (ref. U.S. Pat. No. 3,398,368). Indicating pointer 216, is secured at the end of shaft 142 by means of collar 218, and provides registration of the control point, in terms of the load carrying capability of the distribution transformer. Pointer 216, being mechanically connected to the control switch 140 via common shaft 142, records the maximum clockwise displacement of the control switch, i.e. the control point, in response to an unprecedented peak loading of the distribution transformer. The registration of pointer 216 is independent of the movement of the bimetal spiral 132 except on those occasions when the spiral shifts clockwise far enough to contact switch arm 138 and thereby supply the torque necessary to rotate common shaft 142 which increases the reading of pointer 216. This pointer serves, in other words, to mark the highest scale reading reached by the control switch 140 in the course of clockwise travel on any occasion. An indicated scale reading reflects the highest effective loading of the distribution transformer at any past time, as well as the level of future transformer loading at which the control function of our device will be initiated.

It is worth noting here that the use of a bimetal spiral coil as a rotational driving force in combination with appropriate control switches provides an extremely adaptable device which can be easily modified to suit particular control requirements. The coil can be held stationary at its innermost end allowing its outer end to rotate and act on the switch arms as previously described or the spiral can be attached at its outer end while the inner end remains free to supply the needed rotational motion. The latter configuration is especially well suited to initiate direct rotation of a shaft connected to the inner end of the bimetal coil. This shaft can then be used to deliver torque to a variety of different switch combinations associated with various control functions. For example, an alternate embodiment of our invention is shown in FIGS. 7, 8 and 9 wherein a portion of our device comprising the bimetal element and switch means (the necessary remaining parts having been previously discussed are not shown here) has been modified to accommodate additional load control features. In this embodiment a bimetal element 224 has its outer end soldered or similarly attached to mounting tab 226, which is in turn secured to housing 228. The tip of the inner end of the bimetal spiral coil is terminated in a ninety degree right angle and is received by a keyway provided in shaft 230. The inner end of freely turning shaft 230 is rotatably mounted to housing 228. The outer end of the shaft is smaller in diameter and designed to receive the centrally apertured cam element 232 which is held in place by nut 234.

The inner end of the bimetal spiral coil rotates in response to changes in the controlled load and/or the ambient temperature. The resulting angular displacement is imparted via the attached shaft 230 to likewise rotate cam 232. As viewed in FIG. 8, an increase in the effective load on the distribution transformer produces a clockwise rotation of bimetal element 224 and cam 232. A cam follower 238, comprising the actuator portion of valley switch 240, rides on the perimeter of cam 232 and functions to close the normally open valley switch where operated upon by the driving lobe of the cam. As shown in FIGS. 7 and 8, an actuating arm 242 is attached to cam 232 near its perimeter. This arm extends perpendicularly from the cam and overlaps switching arm 244. A deferring switch 246 and cycling switch 248 are fixedly mounted through their centers on a common shaft 250 and are offset with respect to each other about the axis of said shaft such that the extension of their respective switch arms 244 and 252 are several mechanical degrees apart (as shown in FIG. 8). Note, however, that shaft 250 is not directly connected to the previously discussed shaft 230 but rather is indirectly connected to and driven in part by said shaft 230 via the interconnected cam and switching means as will be discussed below.

A sustained clockwise rotation of shaft 230 and the connected cam 232 brings activating arm 242 into contact with switch arm 244. The continued rotation of cam 232 causes switch arm 244 to rotate (closing switch 246) thereby imparting rotational motion to switch arm 252 via actuating arm 254. Rotation of switch arm 252 closes the contacts of switch 248 and imparts rotational torque to the switch. In this way, the torque originating from the expansional rotation of bimetal spiral coil 224 is transmitted to shaft 250 which drives the peak demand pointer and connected ratchet mechanism described earlier.

This interdependent staggered switch arrangement establishes a control relationship between the various controlled loads and the control point setting such that the service deferral function is effected at a preselected percentage or ratio of the control point value (i.e., the magnitude of the previous peak load), whereas the cycling function is initiated at some higher percentage of the control point value. For example, by judicious angular positioning of control switches 246 and 248 with respect to each other about their common shaft 250, the deferral function provided in part by switch 246 can be initiated at 85 percent of the peak load control point, while the cycling function associated with switch 248 can be initiated at 95 or 100 percent of the control point value. Under the influence of a decreasing load condition, the above described sequence of actions is reversed; cycling switch 248 is first caused to open, with deferring switch 246 then being allowed to open at some later time after an additional decrease in loading conditions has occurred.

An additional feature of the present embodiment is the control of "valley loads". Valley loads are designated loads at each customer's location which are selected for control based on their low priority for service during those periods when power demand is relatively high. Presently, of course, batteries and other types of valley loads are being serviced with power at various times throughout any given 24 hour period and without regard to their contribution to the composite electrical demand on the power network and resultant peak loads. However, if power service to these valley loads is routinely limited to periods when power demand is relatively low, peak loading on the power network is consequently reduced in proportion to the magnitude of those valley loads ordinarily contributing to the peak condition. The valley switch and its associated circuit provide the means needed to regularly service these low priority valley loads during periods of relatively low power demand.

As previously mentioned with reference to FIGS. 7 and 8, valley switch 240 has an actuating means comprising the rolling cam follower 238 which rides on cam 232. Valley switch 240 is mounted and maintained in alignment with respect to the cam 232, by means of bracket 258 which is secured to housing 228 via screws or rivets 260. As seen in FIG. 8, cam 232 comprises a single lobe (indicated by the numeral 262) which drives the valley switch 240 closed on those occasions when the bimetal spiral rotates counterclockwise far enough (in response to decreasing transformer loading) to bring the rolling follower 238 into contact with the lobe. By judiciously choosing the dwell section between the lobe and the point near the perimeter of the cam where the actuating arm 242 is attached, service initiation of the valley loads with respect to net loading on the distribution transformer may be properly selected. For example, power service could be provided to the valley loads only on those occasions when the net magnitude of transformer loading subsides below 50 percent of the peak load value. With reference to FIG. 8, during periods of decreasing loads on the transformer, as in the late evening and early morning hours, the bimetal spiral coil will rotate counterclockwise causing cam 232 to likewise rotate and eventually drive the normally open valley switch 240 to a closed position initiating a control signal which causes full power service to be provided to the valley loads. The control circuit means is essentially similar in configuration to the deferring circuit described earlier with reference to FIG. 1.

Figure 10:
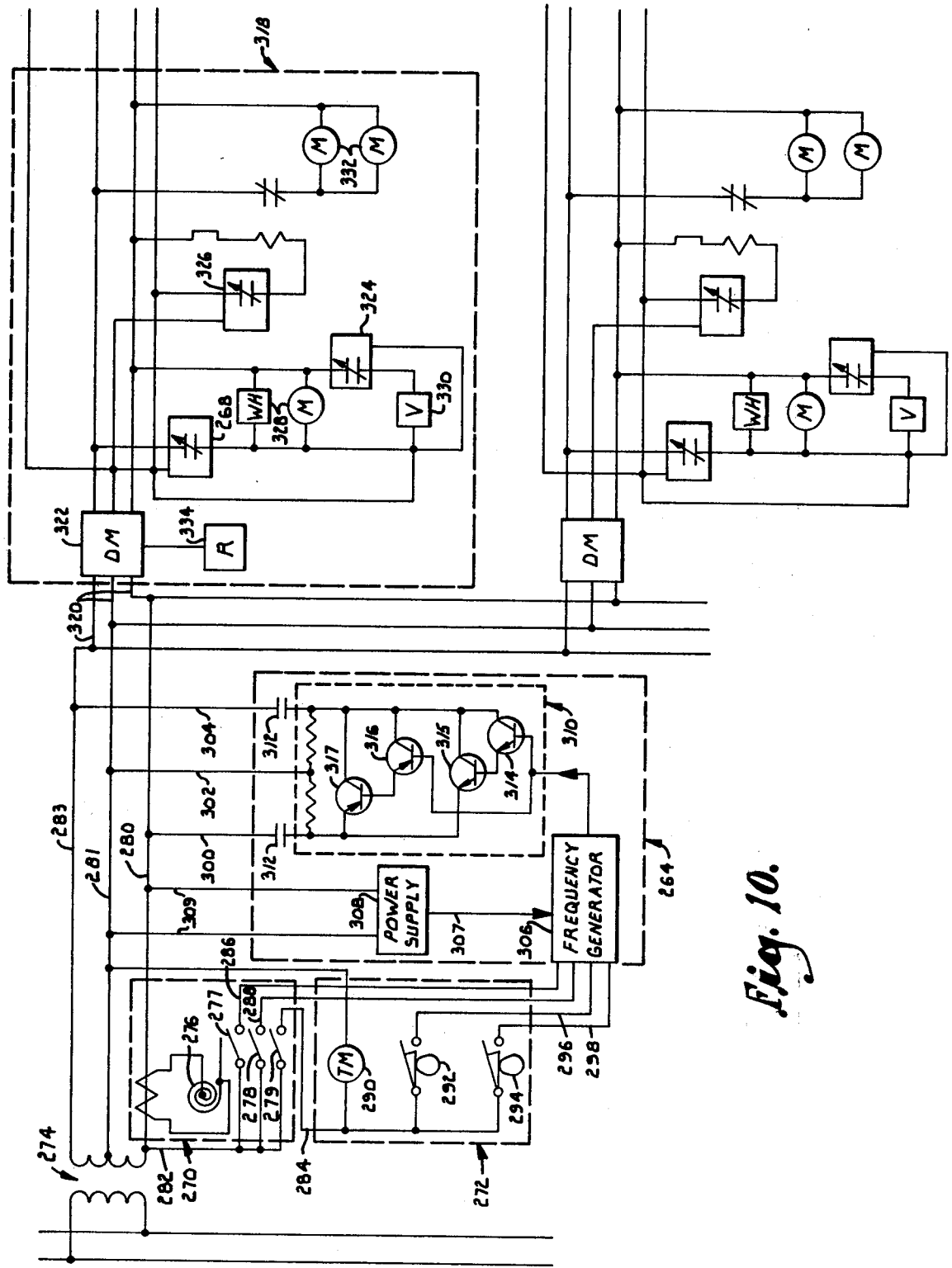
FIG. 10 is a schematic diagram of a modified embodiment of our invention including a means for generating electronic control signals for load control in electrical power systems.

Reference is made now to FIG. 10 which discloses a concept for effectuating the load control function by means of an electronic control signal. Unlike the configuration of FIG. 1 which uses dedicated pilot wires to deliver the control signals to each customer's premises, the embodiment depicted in FIG. 10 delivers the control signals to receiving means (such as receiver 268) at the customer's premises directly in the distribution lines. The control signal is generated in a signal generator (generally indicated within the broken line 264) which is connected in parallel with the distribution lines 280, 281 and 283. Power monitor 270 and timer 272 are essentially the same as those previously disclosed but some of the circuit connections are altered to accommodate the unique operational concept associated with this embodiment of our invention.

In response to a peak load on distribution transformer 274, bimetal spiral coil 276 expands closing normally open switches 277, 278 and 279 at appropriate load levels thereby respectively supplying power to lines 284, 286 and 288 from distribution line 280 via line conductor 282. Switch 277 is connected to line 286 and controls the previously described load deferral operation while switch 279 is connected to line 284 and activates timing motor 290 initiating the load cycling function upon closure of this switch. In this embodiment, both of the switches are closed simultaneously when the control point in reached. Switch 278, on the other hand, is connected to conductor line 288 and controls the above mentioned valley load function. This switch is closed when the valley load control point is reached. The various control functions performed by power monitor 270 and timer 272 thus produce and deliver appropriately timed controlled signals on lines 286, 288, 296 and 298 to the control inputs of signal generator 264. A regulated d.c. power input is sent to the signal generator by means of line 307.

The signal generator produces a plurality of control signals having different frequencies and injects these signals into the power lines for transmission to the customer's premises via outputs 300, 302 and 304. In normal operation, each control function will be assigned a different frequency or code and each group of cycled loads will be given a corresponding control signal frequency or code group. In other words, the deferral function, the valley load function and each group of loads to be cycled will have a different control signal frequency or code group. A large number of different control frequencies and codes can be selected. For example, a single control frequency system can produce about 20 different control signals while a three code system can provide hundreds of different code groups. However, the selected control signal frequency must be high enough to avoid an upstream power flow causing high power signal injection through the distribution transformer and low enough to avoid being completely absorbed by power factor correction capacitors typically found on air conditioning loads. Therefore, the useful frequency range of the system is approximately 750 to 4000 Hz.

In order to assure that a customer will not experience an unnecessary load deferral it is essential that a receiver not be actuated unless a tone sequence of the proper frequency, order and duration is received. The signal generator can be designed to periodically generate a preselected tone sequence capable of actuating an associated receiver. The receiver, on the other hand, would then be latched on for a minimum period of time and be re-activated each time the proper tone sequence was received. Integrated circuit tone decoders of this type are employed in various types of communication systems such as telephone dialing devices for sensing one coded transmission from all others in the presence of substantial system noise. The receiver could also be designed so that loss of a single tone sequence would not reset the receiver to a normal power condition.

The signal generator 264 is comprised of frequency generator 306, power supply 308, amplifier 310 and coupling capacitors 312. Incoming control lines 286, 288, 296 and 298 are inputed to the frequency generator where they are connected to the appropriate signal source of frequency generator 306. The frequency sources may be conventional oscillators or timing circuits such as those manufactured by the Signetics Corporation and identified by the manufacturers number 555. A separate frequency source is provided for each frequency of interest. In the present case, four frequency sources must be provided to perform the deferral function, the valley function, and the cycling of power to two sets of controlled loads. Two different frequencies are required for the cycling funtion because there are two groups of customer's loads that are being cycled in this embodiment. If there were additional groups of loads to be cycled, more frequency channels would have to be used.

If the control signals are represented by tone codes instead of frequency signals, then one signal source can be used to control a large number of different loads. In this case, a large number of receivers or classes of receivers are actuated by means of codes within time frames. The dispatchers code sequences sequentially checks the total number of possible signals and activates the transmitter during the time frame alotted for that channel if transmission over that channel is being called for.

Power is supplied to frequency generator 306 from power supply 308 which comprises a standard 15 volt D.C. filtered supply with an output as low as 0.020 amps. The power supply is connected line-to-neutral via leads 309 to the secondary distribution lines of transformer 274 and may comprise the combination of a transformer, rectifier and filter although capacitors may be used in place of the transformer to obtain sufficient A.C. power.

The output of frequency generator 306 is amplified in amplifier circuit 310. Although a number of two stage amplifier designs are suitable for use in the present application, we have chosen a pair of transistor amplifiers comprising two PNP transistors 314 and 35 in a Darlington connection and two NPN transistors 316 and 317 also in a Darlington connection. In operation, the amplifier functions to vary the impedance from line-to-line at the particular control frequency thereby using the 60Hz voltage in a current sink mode. This voltage is coupled through coupling capacitors 312 to introduce the appropriate voltage signal into the distribution lines by means of lines 300, 302 and 304. The amplitude of the control signal will vary as the 60Hz voltage varies.

Coupling of the signal to the power line can also be accomplished by means of two injection transformers instead of through coupling capacitors 312 and lines 300, 302 and 304. These transformers are split core transformers which are designed for easy installation on the hot distribution lines. The signal output from each injection transformer is limited by the core cross section and the frequency of the control signal.

Figure 14:
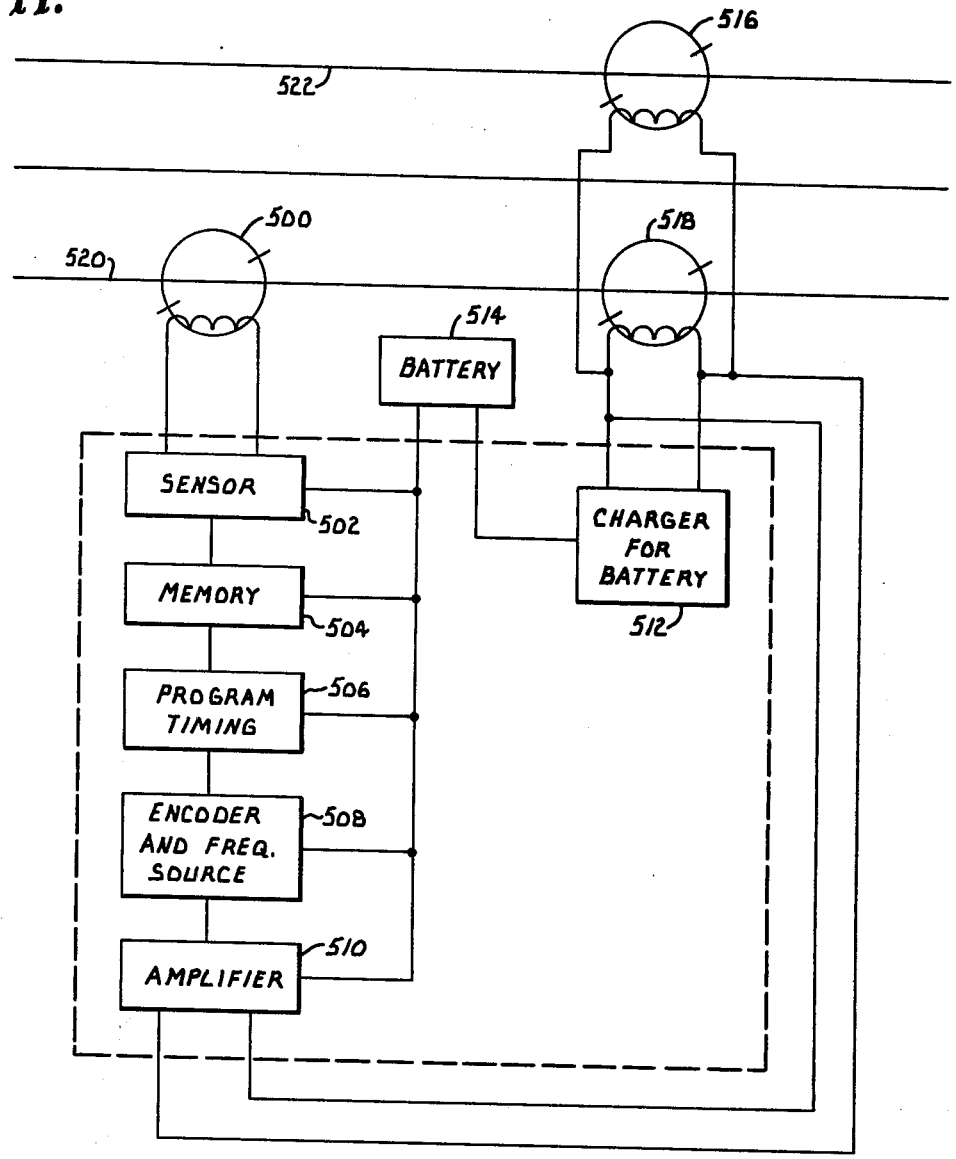
FIG. 14 is a block diagram of an electronic load control device that uses injective transformers to introduce the control signal into the distribution lines.

This coupling method is well suited for use in a completely electronic version of the power monitor device of the present invention as shown in FIG. 14. As shown in FIG. 14, the electronic power monitor includes a power monitor transformer 500 which operates as described earlier. The electronic power monitor also includes a sensor circuit 502 which is comprised of a linear temperature variable element such as a thermistor and a non-linear semiconductor such as a variation on various other non-linear diodes and transistors. The memory circuit retains the previous control point and compares it with the sensed value. This circuit also sets the control point upward as the controlled load increases above previous peaks and contains means for resetting the control point to a preselected value. The program timing circuit 506 and the control signal amplifier 508 are well known in the art while the encoder and frequency generator is similar to the frequency generator 306 shown in FIG. 10. The injection transformers generally designated by the numerals 516 and 518 are located at the hot distribution lines 520 and 522 with the output from amplifier 510 being provided to the primary coils of the injection transformers and the hot distribution lines 520 and 522 acting as the secondary coils of the transformers. The 60Hz power induced in these transformers is used by the battery charger circuit 512 to charge the battery 514 which is used to power the timing, memory and signal generating functions so that no electrical connection need be made.

The most efficient method for injection of a control signal into the distribution lines is shown in FIG. 12. The signal generator shown in this figure is basically comprised of a frequency encoder 400, amplifiers 402, 404 and 406, and coupling transformer 408. The power supply 410 is a conventional circuit capable of providing a 30 volt D.C. power signal on lines 412 and 414. The signal generator shown in this figure is particularly useful because it limits 60Hz voltage feedback while allowing efficient passage of the control signal.

The appropriate control code is generated in frequency encoder 400. The generated code signal is then provided to three separate conductor lines 438, 440 and 442 wherein the signal is shifted in phase a set amount by means of resistors 416, 418 and 420, capacitor 422 and inductor 424. Each of the phase shifted signals is then amplified in amplifiers 402, 404 and 406 before being provided to coupling transformer 408 for injection into the distribution lines. In order to assure receiver actuation, the control signal must be amplified substantially above the receiver's threshold sensitivity to overcome transmission losses. Coupling capacitors 432, 434 and 436 and inductors 426, 428 and 430 are provided to isolate the amplifiers from 60Hz voltage feedback.

In addition to being used in conjunction with the above described power monitor, the three phase signal generator of FIG. 12 can also be used by the dispatcher of a power company to generate a universal control signal capable of reaching all the distribution mounted power monitors. Signal transmission from the dispatcher to each power monitor installation would employ control signals in the 400–1000 Hz range and these signals would comprise a tone coded transmission wherein the naturally occurring harmonics of 60 cycles would be avoided. Each receiver located on a power monitor could be set to be actuated by a different transmission code or could be grouped into combinations responsive to a single control signal. The universal control signal could also be provided directly from the dispatcher to the various loads of the system thereby removing preselected loads from power service directly. The use of a universal control signal allows for emergency load shedding on loss of generation capability by the utility and for selective control of the peak load by regulating the demand or demand-on-peak of commercial and industrial power users.

The output control signals from the signal generator are sent to each of the customer's premises served by transformer 274. An example of such a customer is shown within the broken line 318 and power is delivered to this customer by branch lines 320. The incoming control signals are received by demand meter 322 and the receivers 268, 324 and 326 which are connected in series with their respective loads control circuits for these loads (water heater and clothes dryer loads 328, valley load 330 and air conditioning load 332).

The above mentioned receivers include means for detecting a control signal of a given frequency or code and serve to remove the associated load from (or add the valley load to) the distribution circuit upon receipt of the appropriate control signal. For practical applications, the receiver may comprise a physically small module which includes both a male electrical plug and a female receptacle such that the module may be interposed between an ordinary electrical wall receptacle and the male plug of the electrical load which is to be controlled.

Figure 11:
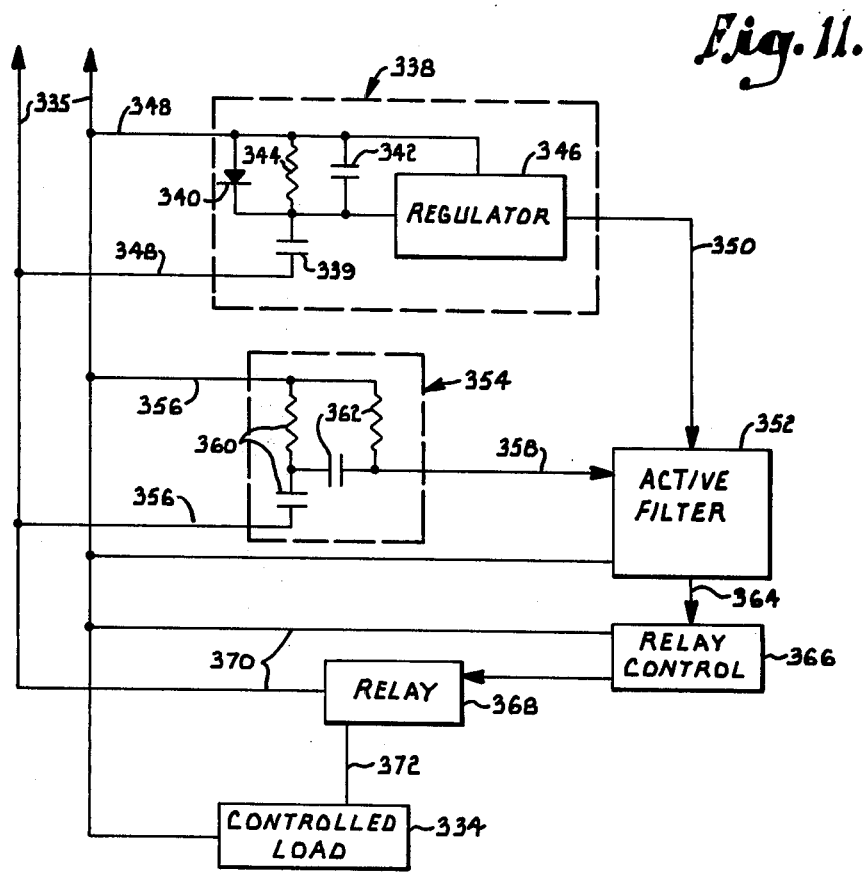
FIG. 11 is a partial block diagram of a device for receiving electronic control signals which forms a part of our invention.

Attention is now directed to FIG. 11 wherein a typical receiver device is displayed in greater detail. The receiver is a two part network connected line-to-neutral between the controlled load 334 and the power service lines 335. Lines 335 form a male electrical plug that can be inserted into a typical wall plug receptacle. Power for the receiver is derived in power supply circuit 338, which is comprised of voltage dropping and coupling capacitor 339, Zener diode 340, filtering capacitor 342, resistor 344 and a three terminal positive integrated circuit regulator 346 which includes appropriate short circuit protection provisions. The regulator is optional depending on the sensitivity of the active filter to ripple and voltage fluctuations. Input power is delivered to the power supply from the 110V line source on lines 348 and the D.C. output from the power supply is sent on line 350 to active filter decoder 352. A number of similar low current output power supply designs would work equally well in the present application. The above described power supply could also be used in the previously discussed signal generator 264 shown in FIG. 10.

A 60Hz rejection filter is indicated within broken lines 354. Its input is connected in parallel to the incoming 110V line source via lines 356 and its output is fed into active filter 352 by means of line 358. The rejection filter comprises resistor/capacitor pairs 360 and 362 which form a two stage filter (a single stage filter is adequate with most receiver designs) suitable to reject the 60Hz power voltage while passing voltages of higher frequencies. This filtering process limits the input voltage to active filter 352 in order to prevent damage to the filter. An appropriate transformer could also be used to perform this voltage limiting function.

Active filter 352 screens out received signals other than the appropriate control signal. The active filter is tuned to provide maximum output response at the control signal frequency or frequencies and responds to a particular received control signal by reproducing the amplified signal on its output line 364. This circuit is of conventional design and may be comprised of an operational amplifier with appropriate resistors and capacitors in its input and feedback loop. The filter can be then tuned to pass a particular frequency signal by varying the value of one of the resistive elements associated with the operational amplifier.

The output of active filter 352 is delivered to relay control 366 via line 364. Relay control 366 energizes relay 368 by connecting it across the 110V source lines via lines 370. The relay control uses conventional devices such as a transistor/diode combination or a TRIAC to perform the necessary switching function. The contacts of relay 368 are normally closed since power service is normally supplied to these loads (a normally open relay is used in conjunction with valley loads). Therefore, receipt of the appropriate control signal at relay control 366 causes power to be applied to the relay coil thereby energizing the coil and opening the normally closed contacts of the relay. Opening of the relay contacts open circuits one side of the controlled load 334 which is connected via line 372 through relay 368 to the 110V line. Power service to the controlled load 334 is thus interrupted until the control signal ceases to be received.

Demand meter 332, shown in FIG. 10, records the demand level created during the time receiver 334 is actuated by the loads connected thereto during peak load periods. The demand meter is either a conventional apparatus commonly used by utility companies (in addition to the universally employed watt hour meter) the measure the demand created by a customer's peak load or a modified watt hour meter as noted later. If the customer does not use defeat switch 74, then the demand meter will measure only the partial demand created by the cycled air conditioning load 326 and other uncontrolled loads. If, on the other hand, the customer chooses to use the defeat switch and avoid service interruption then the demand meter will measure the total demand created by all of the loads during a period of peak demand.

A modified watt hour meter fitted with the above described receiver can also be used to perform the demand measuring function. The needed modifications can be easily accomplished by one familiar with the construction of watt hour meter devices.

An example of such a demand measuring device is shown in FIG. 13. As shown in this figure, receiver 450 is provided to measure and record the highest peak demand occurring over a particular period of time or the average peak over a period of time. The time period is controlled by time base circuit 452 which generates the time period by counting down the cycles of the 60Hz power line 454. The watt hour meter disc 456 is provided with a hole 458 which causes the opto electronic coupler 460 to produce an output pulse each time the hole on the disc passes between sensor arms 462 and 464. The logic unit accomplishes one or both of the following functions; measurement of the maximum peak during a preselected time period and measurement of the average demand. The measured results are then displayed at 468.

It should be mentioned here that although the operational concept of the demand meter has been described with reference to the electronic signal sending embodiment associated with FIGS. 10 and 11, such demand meters may likewise be utilized in combination with the dedicated wire signaling embodiment previously described and depicted in FIG. 1. The demand meters designated by the numerals 378 and 380 in FIG. 1 thus may also perform a similar peak demand recording function.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contempleted by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A load management system for reducing the load in an electrical power distribution network having at least one remotely located distribution transformer that is capable of supplying electrical power to at least one associated transformer load by means of at least one alternating current distribution line, said system comprising:

power monitor means for monitoring the power load on said distribution transformer, said power monitor means comprising a current transformer means for measuring current flow within said alternating current distribution line, said current transformer means being operable to produce a secondary current which is related to the measured current flow and transducer means for converting said secondary current into a reading representation of the load on said distribution transformer, said transducer means being comprised of a bimetal spiral coil, said bimetal spiral coil being electrically coupled with said current transformer means such that said secondary current is caused to flow through said coil to vary the temperature of said coil in accordance with the magnitude of said secondary current, said bimetal spiral coil having one end rigidly anchored and the other end free to move in accordance with the temperature of said coil to provide said reading representation of the load on said distribution transformer;

first switch means for producing an activation signal whenever said reading is above a preset control point; and means for reducing the power load on said distribution transformer in response to said activation signal.

2. The invention in claim 1 including means for displaying said reading.

3. The invention in claim 1 including means for adjusting said control point as a function of the reduced transformer power load, said adjusting means being operable to change said control point each time the reduced transformer power load reaches a new maximum value, said control point being a function of the magnitude of the reduced transformer power load.

4. The invention of claim 3, including means for displaying the value of said control point.

5. The invention in claim 3 including means for resetting said control point to a preselected value.

6. The invention in claim 5 wherein said resetting means includes means for activating said resetting means from an external locaton.

7. The invention in claim 1 including means for measuring the power demand of said transformer load, said demand measuring means being operable to record the peak demand over a set period of time.

8. The invention in claim 1 including means for measuring the power demand of said transformer load, said demand measuring means being operable to record the average demand over a set period of time.

9. The invention of claim 1 including means for producing said activation signal from a remote location independent of the power load on said distribution transformer.

10. The invention in claim 9 wherein said means for producing said activation signal from a remote location is comprised of:
signal generator means for generating a control signal;
means for transmitting said control signal throughout said electrical power distribution network; and
receiver means for detecting said control signal, said receiver means being operable to generate said activation signal in response to said control signal.

11. The invention in claim 10 wherein said signal generator means includes a frequency encoder means for providing numerous individually coded control signals.

12. The invention in claim 1 wherein said means for reducing the transformer power load is comprised of means for completely interrupting electrical service to said transformer load in response to said activation signal.

13. The invention in claim 12 wherein said means for completely interrupting electrical service is comprised of:
means for generating an interrupt signal in response to said activation signal;
means for interrupting electrical service to said transformer load in response to said interrupt signal; and
means for operably coupling said generating means and said electrical service interrupting means.

14. The invention in claim 12 wherein said means for completely interrupting electrical service is comprised of:
signal generator means for generating an interrupt signal in response to said activation signal;
means for injecting said interrupt signal into said at least one alternating current distribution line; and
receiver means for detecting the presence of said interrupt signal on said distribution line and for interrupting electrical service to said at least one transformer load in response to said interrupt signal.

15. The invention in claim 14 wherein said injecting means is comprised of an injection transformer located at said one distribution line, said injection transformer having a primary coil for accepting said interrupt signal from said signal generator means and a secondary coil comprised of said one distribution line, said primary coil being coupled with said signal generator means so as to circulate the 60Hz current present in said distribution line.

16. The invention in claim 14 wherein said signal generator means includes a frequency encoder means for providing numerous individually coded control signals.

17. The invention in claim 1 wherein said means for reducing the transformer power load is comprised of means for intermittently interrupting electrical service to said at least one transformer load in response to said activation signal.

18. The invention of claim 17 wherein said means for intermittently interrupting electrical service is comprised of:
timing and switching means for intermittently generating an interrupt signal in response to said activation signal;
means for interrupting electrical service to said at least one transformer load in response to said interrupt signal; and
means for operably coupling said generating means and said electrical service interrupting means.

19. The invention of claim 18 including means for producing said activation signal from a remote location independent of the power load on said distribution transformer.

20. The invention of claim 19 wherein said remote activating means includes means for varying the timing and switching sequence of said timing and switching means from said remote location.

21. The invention in claim 17 wherein said means for intermittently interrupting electrical service is comprised of:
timing and switching means for intermittently generating a timing signal in response to said activation signal;
signal generator means for generating an interrupt signal in response to said timing signal;
means for injecting said interrupt signal into said at least one alternating current distribution line; and
receiver means for detecting the presence of an interrupt signal on said distribution line and for interrupting electrical service to said at least one transformer load in response to said interrupt signal.

22. The invention in claim 21 wherein said injecting means is comprised of an injection transformer located at said at least one distribution line, said injection transformer having a primary coil for accepting said interrupt signal from said signal generator means and a secondary coil comprised of said one distribution line, said primary coil being coupled with said signal generator means so as to circulate the 60Hz current present in said distribution line.

23. The invention in claim 21 wherein said signal generator means includes a frequency encoder means for providing numerous individually coded control signals.

24. The invention as in claim 1 wherein said first switch means is comprised of an activation arm rigidly secured to the free end of said coil and protruding outward therefrom and a first switch mechanism biased toward an open position wherein said activation signal is precluded, said first switch mechanism being located adjacent to said coil at a position representative of said preset control point, said first switch mechanism being further arranged to be engaged and closed by said activation arm whenever said coil is in a position representative of a distribution transformer load which is greater than said control point, closure of said first switch mechanism being effective to produce said activation signal.

25. The invention as in claim 24 including:
a freely rotatable shaft, said first switch mechanism being mounted on said shaft such that any movement of said coil to a position representative of a distribution transformer load which is greater than said control point causes said activation arm to forceably rotate said first switch mechanism about said shaft to a new position which is representative of a new control point;

a circular ratchet gear rigidly secured to said shaft to rotate co-axially with said shaft; and a pawl which cooperates with said circular ratchet gear to retain said first switch mechanism at said new position, said pawl being arranged to allow movement of said ratchet gear in a direction representative of an increasing distribution transformer load and to prevent movement of said ratchet gear in a direction representative of a decreasing distribution transformer load.

26. The invention as in claim 1 including a second switch means for generating a second activation signal whenever said reading is above a second present control point.

27. The invention as in claim 26 wherein said reducing means is comprised of means for completely interrupting electrical service to at least one transformer load in response to said activation signal and means for intermittently interrupting electrical service to a different transformer load in response to said second activation signal.

28. The invention as in claim 1, including a switch means for generating a valley control signal whenever said reading drops below a valley preset control point and means for supplying electrical service to at least one preselected transformer load in response to said valley control signal.

29. A load management system for reducing the load in a three-phase alternating current distributing network capable of providing electrical service to at least one network load by means of three separate phase conductor lines, said system comprising:

signal generator means for generating a control signal;

means for injecting said control signal into said three separate phase conductor lines, said injecting means comprising means for separating said control signal into a first control signal, a second control signal and a third control signal, each control signal being separated in phase from the other two control signals by a set amount and a three-phase coupling transformer for introducing each of the three phase shifted control signals into a different phase conductor line, said coupling transformer having three separate primary coils, each primary coil being arranged to receive a different one of the phase shifted control signals, said coupling transformer also having three separate secondary coils, each secondary coil being electrically coupled with a different phase conductor line;

receiver means for detecting the presence of said control signal on said three separate phase conductor lines and for interrupting electrical service to said at least one network load in response to said control signal.

30. The invention as in claim 29 wherein said injecting means includes coupling capacitors and coupling inductors for restricting the amount of 60Hz voltage feed to said signal generator means.

31. A load management system for reducing the load in an electrical power distribution network having at least one remotely located distribution transformer that is capable of supplying electrical power to at least one associated transformer load by means of at least one alternating current distribution line, said system comprising:

power monitor means for monitoring the power load on said distribution transformer, said power monitor means comprising a current transformer means for measuring current flow within said alternating current distribution line, said current transformer means being operable to produce a secondary current which is related to the measured current flow and transducer means for converting said secondary current into a reading representative of the load on said distribution transformer, said transducer means being comprised of a first rotatable shaft and a bimetal spiral coil, said bimetal spiral coil being electrically coupled with said current transformer means such that said secondary current is caused to flow through said coil to vary the temperature of said coil in accordance with the magnitude of said secondary current, said bimetal spiral coil having one end connected to said first rotatable shaft and the other end anchored so that said coil is effective to rotate said first rotatable shaft in response to the temperature of said coil to provide said reading representative of the load on said distribution transformer;

switch means for producing an activation signal whenever said reading is above a preset control point; and means for reducing the power load on said distribution transformer in response to said activation signal.

32. The invention as in claim 31 including a cam rigidly secured to said first rotatable shaft so as to rotate in unison with said first rotatable shaft.

33. The invention as in claim 32 wherein said switch means is comprised of a switch mechanism biased toward an open position wherein said activation signal is precluded and a cam follower to operate said switch mechanism in accordance with a preselected pattern, said pattern being arranged to close said switch mechanism whenever said cam is in a position representative of a distribution transformer load which is greater than said control point, closure of said switch mechanism being effective to produce said activation signal.

34. The invention as in claim 32 wherein said switch means is comprised of an activation arm rigidly secured to said cam and protruding outward therefrom and a switch mechanism biased toward an open position wherein said activation signal is precluded, said switch mechanism being located adjacent to said cam at a position representative of said preset control point, said switch mechanism being further arranged to be engaged and closed by said activation arm whenever said cam is in a position representative of a distribution transformer load which is greater than said control point, closure of said switch mechanism being effective to produce said activation signal.

35. The invention as in claim 34 including:

a second freely rotatable shaft, said switch mechanism being mounted on said second rotatable shaft such that any movement of said cam to a position representative of a distribution transformer load which is greater than said control point causes said activation arm to forceably rotate said switch mechanism about said second rotatable shaft to a new position which is representative of a new control point;

a circular ratchet gear rigidly secured to said shaft to rotate co-axially with said shaft; and a pawl which cooperates with said circular ratchet gear to retain said switch mechanism at said new position, said pawl being arranged to allow movement of said ratchet gear in a direction representative of an increasing distribution transformer load and to prevent movement of said ratchet gear in a direction representative of a decreasing distribution transformer load.

36. The invention as in claim 31 wherein said means for reducing the transformer power load is comprised of means for completely interrupting electrical service to said at least one transformer load in response to said activation signal.

37. The invention in claim 31 wherein said means for reducing the transformer power load is comprised of means for intermittently interrupting electrical service to said at least one transformer load in response to said activation signal.

38. The invention as in claim, 31 including a second switch means for generating a second activation signal whenever said reading is above a second present control point.

39. The invention as in claim 38 wherein said reducing means is comprised of means for completely interrupting electrical service to at least one transformer load in response to said activation signal and means for intermittently interrupting electrical service to a different transformer load in response to said second activation signal.

40. The invention as in claim 31, including a switch means for generating a valley control signal whenever said reading drops below a valley present control point and means for supplying electrical service to at least one preselected transformer load in response to said valley control signal.

41. A load management system for reducing the load in an electrical power distribution network having at least one remotely located distribution transformer that is capable of supplying electrical power to at least one associated transformer load by means of at least one alternating current distribution line, said system comprising:
  power monitor means for monitoring the power load on said distribution transformer, said power monitor means comprising a current transformer means for measuring current flow within said alternating current distribution line, said current transformer means being operable to produce a secondary current which is related to the measured current flow and sensor means electrically coupled with said current transformer means such that said secondary current flows through said sensor means, said sensor means being operable to cause a forward voltage drop across said sensor means, said forward voltage drop being a nonlinear function of the magnitude of said secondary current; means for measuring the forward voltage drop across said sensor means, said mesuring means being operable to generate an output signal representative of the measured forward voltage drop; and means for converting said output signal into a reading representative of the load on said distribution transformer;
  switch means for producing an activation signal whenever said reading is above a preset control point; and
  means for reducing the power load on said distribution transformer in response to said activation signal.

42. The invention as in claim 41 wherein said switch means is comprised of means for comparing said reading with said control point and means for producing said activation signal if said reading is greater than said control point.

43. The invention in claim 41 wherein said means for reducing the transformer power load is comprised of means for completely interrupting electrical service to said at least one transformer load in response to said activation signal.

44. The invention in claim 41 wherein said means for reducing the transformer power load in comprised of means for intermittently interrupting electrical service to said at least one transformer load in response to said activation signal.

45. The invention as in claim 41, including a switch means for generating a valley control signal whenever said reading drops below a valley preset control point and means for supplying electrical service to at least one preselected transformer load in response to said valley control signal.

* * * * *